US010793166B1

(12) United States Patent
Schonert et al.

(10) Patent No.: US 10,793,166 B1
(45) Date of Patent: Oct. 6, 2020

(54) METHOD AND SYSTEM FOR PROVIDING OBJECT DETECTION WARNING

(71) Applicant: Caterpillar Inc., Deerfield, IL (US)

(72) Inventors: Sarah Elizabeth Schonert, Dunlap, IL (US); Renita Ryan Metcalf, Peoria, IL (US); Darrell Richards, Bloomington, IL (US); Kristen Ann Gerstner, Peoria, IL (US); Micheal David Valerio, Morton, IL (US); Shailesh Babu Ramineni, Peoria, IL (US); Brad Robert Van De Veer, Washington, IL (US); Qi Xing, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/352,994

(22) Filed: Mar. 14, 2019

(51) Int. Cl.
*B60W 50/14* (2020.01)
*B60W 30/095* (2012.01)
*G06K 9/00* (2006.01)

(52) U.S. Cl.
CPC ........ *B60W 50/14* (2013.01); *B60W 30/0956* (2013.01); *G06K 9/00805* (2013.01); *B60W 2050/146* (2013.01)

(58) Field of Classification Search
CPC ............. B60W 50/14; B60W 30/0956; B60W 2050/146; G06K 9/00805
See application file for complete search history.

(56) References Cited

U.S. PATENT DOCUMENTS

| | | | |
|---|---|---|---|
| 5,459,460 A | 10/1995 | Nishino | |
| 5,786,772 A | 7/1998 | Schofield et al. | |
| 8,170,787 B2 | 5/2012 | Coats et al. | |
| 8,917,292 B2 | 12/2014 | Gotou et al. | |
| 9,139,133 B2 | 9/2015 | Eng et al. | |
| 9,457,718 B2 | 10/2016 | Husted et al. | |
| 9,529,347 B2 | 12/2016 | Roach et al. | |
| 9,633,563 B2 | 4/2017 | Gharsalli et al. | |

FOREIGN PATENT DOCUMENTS

KR       2006067172 A       6/2006

*Primary Examiner* — Ryan W Sherwin

(57) ABSTRACT

A method of providing object detection warning to an operator of a machine is provided. The machine includes object detection modules, a display unit and a controller communicably coupled to the object detection modules and the display unit. The method detects at least one object being located within a predefined distance range from the machine and determines a distance and position of the detected at least one object relative to the machine. The method further displays a threat warning widget on the display unit. The widget includes a plurality of threat level indicators, each of the threat level indicators being representative of a warning level as a function of distance and position of the object relative to the machine. Furthermore, the method activates at least one threat level indicator based on the determined distance and position of the detected at least one object relative to the machine.

16 Claims, 7 Drawing Sheets

US 10,793,166 B1

METHOD AND SYSTEM FOR PROVIDING OBJECT DETECTION WARNING

TECHNICAL FIELD

The present disclosure relates generally to object detection systems and methods. More particularly, the present disclosure relates to a method and system for providing object detection warning to an operator of a machine operating at a worksite.

BACKGROUND

Large machines, such as, wheel loaders, off-highway haul trucks, excavators, motor graders, and other types of earthmoving machines are used to perform a variety of tasks that often involve moving intermittently between and stopping at certain locations within a worksite. Operators of such machines need to be aware of the machine surroundings to perform smooth operations at the worksite. However, the operator can directly view only a portion of surroundings of the machines as there exist a number of blind spots around the machine at the worksite, that may not be directly visible to the operator during operation of the machine. Therefore, accurate operation of the machine becomes a challenge for the operator.

U.S. Pat. No. 9,139,133 (hereinafter referred to as the '133 patent) relates to a vehicle collision warning system and method that alerts a driver of an impending collision by displaying enhanced video of an upcoming road segment, where the enhanced video includes an in-path object that is highlighted so that it stands apart. The system receives video of an upcoming road segment from a forward-looking vision system, obtain certain collision data for an in-path object, and then use the video and the collision data to provide enhanced video to a visual display that is seen by the driver. The video may include an in-path object that is highlighted according to the collision data (e.g., highlighted with a color-coded scheme where the in-path object changes color based on time-to-collision data) so that it stands apart from the rest of the upcoming road segment.

SUMMARY OF THE INVENTION

In one aspect, a method of providing object detection warning to an operator of a machine is provided. The machine includes one or more object detection modules, a display unit and a controller communicably coupled to the one or more object detection modules and the display unit. The method detects at least one object being located within a predefined distance range from the machine and determines a distance and position of the detected at least one object relative to the machine. The method further displays a threat warning widget on the display unit. The widget includes a plurality of threat level indicators, each of the threat level indicators being representative of a warning level as a function of distance and position of the object relative to the machine. Furthermore, the method activates at least one threat level indicator based on the determined distance and position of the detected at least one object relative to the machine.

In another aspect, an object detection warning system is provided. The system includes one or more object detection modules, positioned on the machine, for detecting at least one object being located within a predefined distance range from the machine. The system further includes a display unit for displaying a threat warning widget including a plurality of threat level indicators, each of the threat level indicators being representative of a warning level as a function of distance and position of the object relative to the machine. Furthermore, the system includes a controller communicably coupled to the one or more object detection modules and the display unit. The controller is configured to determine a distance and position of the detected at least one object relative to the machine and control the display of the threat warning widget on the display unit by activating at least one threat level indicator of the plurality of threat level indicators based on the determined distance and position of the detected at least one object relative to the machine.

In a yet another aspect, a machine having the object detection warning system is provided. The object detection warning system includes one or more object detection modules positioned on the machine for detecting at least one object being located within a predefined distance range from the machine and one or machine cameras positioned on the machine. Each of the one or more object detection modules and the machine cameras define a plurality of threat zones corresponding to a respective capturing range. The system further includes a display unit for displaying a threat warning widget including a plurality of threat sectors for each of the plurality of threat zones, each of the threat sectors including a plurality of threat level indicators being representative of warning levels as function of distance and position of the object relative to the machine. Furthermore, the system includes a controller communicably coupled to the one or more object detection modules and the display unit. The controller is configured to determine a distance of the detected at least one object relative to the machine and detect the at least one object being positioned within a threat zone. Further, the controller is configured to control the threat warning widget displayed on the display unit by activating at least one threat level indicator of one of the threat sectors based on the detected threat zone and the distance of the detected at least one object relative to the machine.

DETAILED DESCRIPTION

Reference will now be made in detail to specific embodiments or features of the present disclosure, examples of which are illustrated in the accompanying drawings. Generally, corresponding reference numbers will be used throughout the drawings to refer to the same or corresponding parts. Also, wherever possible, the same reference numbers will be used throughout the drawings to refer to the same, or the like parts.

Figure 1:
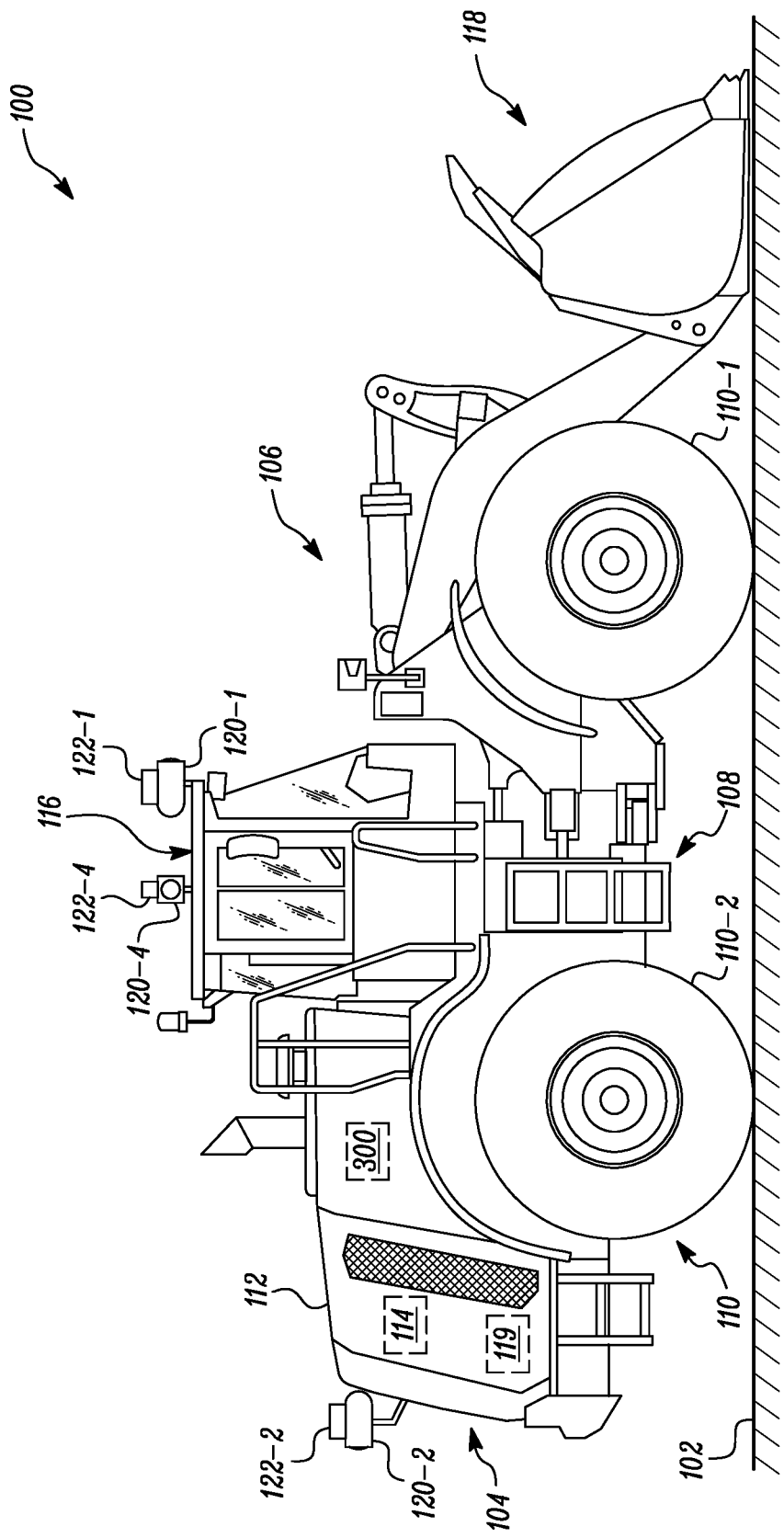
FIG. 1 illustrates an exemplary machine including an object detection warning system, in accordance with an embodiment of the present disclosure.

FIG. 1 illustrates an exemplary machine 100 operating at a worksite 102. For example, the machine 100 may be embodied as a loader, a compactor, a dozer, an excavator, or any other similar machine. The machine 100 may be an earth moving machine, a construction machine, a mining machine, an agricultural machine, a forest machine, etc. In the illustrated embodiment, the machine 100 is depicted as a wheel loader. Further, the machine 100 may be a manned machine or an unmanned machine. In some embodiments, the machine 100 may be a machine having various levels of autonomy, such as a fully-autonomous machine, a semi-autonomous machine, a remotely operated machine, or a remotely supervised machine.

In an embodiment of the present disclosure, the machine 100 includes a first portion 104 and a second portion 106 capable of articulation and oscillation with respect to one another. To this end, the machine 100 includes a two-part frame system or a split chassis system 108 that supports both the first machine part 104 and the second machine part 106 atop respective sets of ground engaging members 110. The ground engaging members 110 are configured to propel the machine 100 at the worksite 102. As shown in FIG. 1, the ground engaging members 110 include a set of drive wheels having a pair of front wheels 110-1 and a set of rear wheels 110-2. Although the ground engaging members 110 are shown to be drive wheels, it may be contemplated that other types of ground engaging members, such as endless tracks, may also be implemented.

The first portion 104 of the machine 100 supports an engine compartment 112 to house a power unit 114 and an operator cab 116. The power unit 114 includes an engine, hereinafter referred to as the engine 114, that may be based on one of the commonly applied power-generation units, such as an internal combustion engine (ICE) having a V-type configuration engine, an in-line, configuration engine, or an engine with different configurations, as is conventionally known. However, aspects of the present disclosure, need not be limited to a particular type of engine 114.

Further, the operator cab 116 may be an enclosure that may include one or more of electronic panels, displays, buttons, joysticks and various other physically actuable entities. It may further be contemplated that the operator cab 116 may be remotely located in case of a remotely operated machine 100.

The second portion 106 of the machine 100 includes a work tool 118 configured to perform a designated work, such as modifying a work surface at the worksite 102. For example, the work tool 118 may be a bucket, grapple, grader, and so on, that may be powered by the power unit 114.

Figure 2:
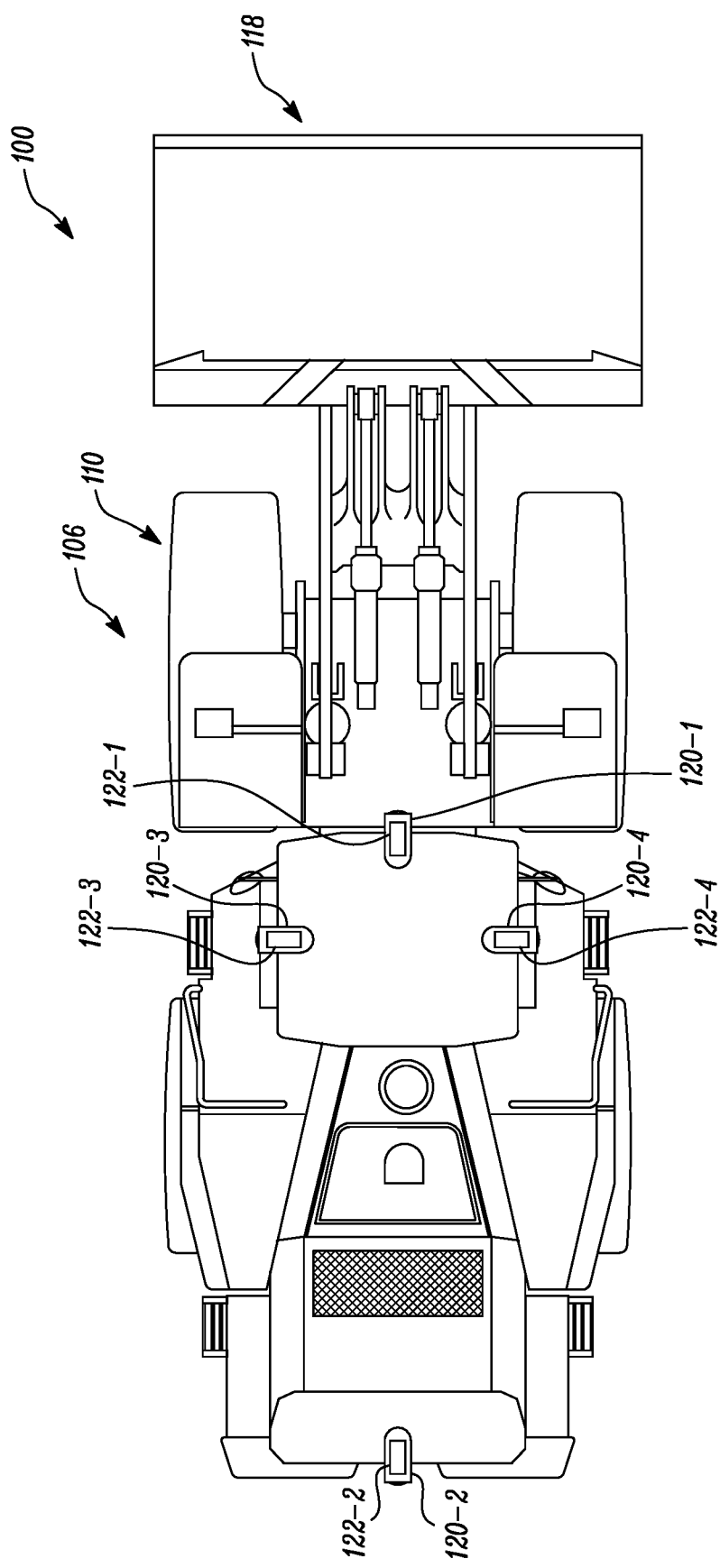
FIG. 2 illustrates a top view of the exemplary machine of FIG. 1.

The machine 100 includes an object detection system 119 configured to monitor the surroundings of the machine 100 and detect objects in proximity of the machine 100. The object detection system 119 may include one or more machine cameras 120 and one or more object detection modules 122, positioned on the machine 100. The machine cameras 120 are positioned on one or more sides of the machine 100 and are configured to capture images of the surroundings of the machine 100, such as to cover the blind zones and low visibility zones in the surroundings of the machine 100. In the illustrated example, the machine 100 includes four machine cameras 120-1, 120-2, 120-3 and 120-4, positioned on front, rear, left and right side (shown in FIG. 2) of the machine 100 respectively. It may be contemplated that the sides of the machine 100 are defined as per the direction of travel of the machine 100. Each of the machine cameras 120 has a respective field of view for capturing images of the surroundings of the machine 100. For example, the machine camera 120-1 is configured to capture the front region of the surrounding of the machine 100, whereas the rear machine camera 120-2 is configured to capture the rear side of the surrounding of the machine 100. Similarly, the left and right machine cameras 120-3, 120-4 are configured to capture left and right side of the surrounding the machine 100.

The object detection system 119 further includes the object detection modules 122 positioned on one or more sides of the machine 100 and configured to detect an object in proximity to the machine 100. In an exemplary embodiment, the machine 100 includes four object detection modules 122-1, 122-2, 122-3 and 122-4 positioned in conjunction to the machine cameras 120-1, 120-2, 120-3 and 120-4, respectively.

The object detection modules 122 may include radars, well known in the art, having their respective capturing ranges and configured to detect objects within a predefined range of distances falling in their capturing ranges. The object detection modules 122 may include near range, medium range, and/or far range radars configured to detect objects at predefined range of distances. For example, a near range may correspond to a distance range of 1 meter to 8 meters, whereas the medium range may correspond to a distance range of 8 meters to 18 meters and the far range may correspond to 18 meters to 30 meters distance range from the machine 100. It may be contemplated that the values of the ranges of distances may vary to achieve similar results, without deviating from the scope of the claimed subject matter. It may also be contemplated that other typical obstacle detection sensors, such as sonar systems, laser systems, optical systems, infrared systems, etc., may also be included without deviating from the scope of the claimed subject matter.

Although the machine cameras 120 and the object detection modules 122 are shown to be positioned at four sides of the machine 100 and in conjunction to one another, it may be contemplated that the number and positions of the machine cameras 120 and the object detection modules 122 may be varied to achieve similar results without deviating from the scope of the claimed subject matter. In some alternative examples, the machine cameras 120 and the object detection modules 122 may be positioned independent of one another. In some other examples, the machine cameras 120 and the object detection modules 122 may be combined into a single unit without deviating from the scope of the claimed subject matter.

In an embodiment of the present disclosure, the machine 100 includes an object detection warning system 300 for providing a warning of an object detected in proximity of the machine 100, to an operator stationed within the operator cab 116. The object detection warning system 300 and its operation is further described in greater detail with reference to FIGS. 3 through 6.

The object detection warning system 300, hereinafter interchangeably referred to as the system 300, may include suitable logic, circuitry, and/or interfaces that are configured to provide warning of an object detected near the machine 100. A person having ordinary skill in the art would appreciate that the scope of the disclosure is not limited to include the system 300 provided onboard the machine 100. In some embodiments, the system 300, or portions of the system 300, may be implemented remotely with respect to the machine 100, without departing from the scope of the disclosure.

Figure 3:
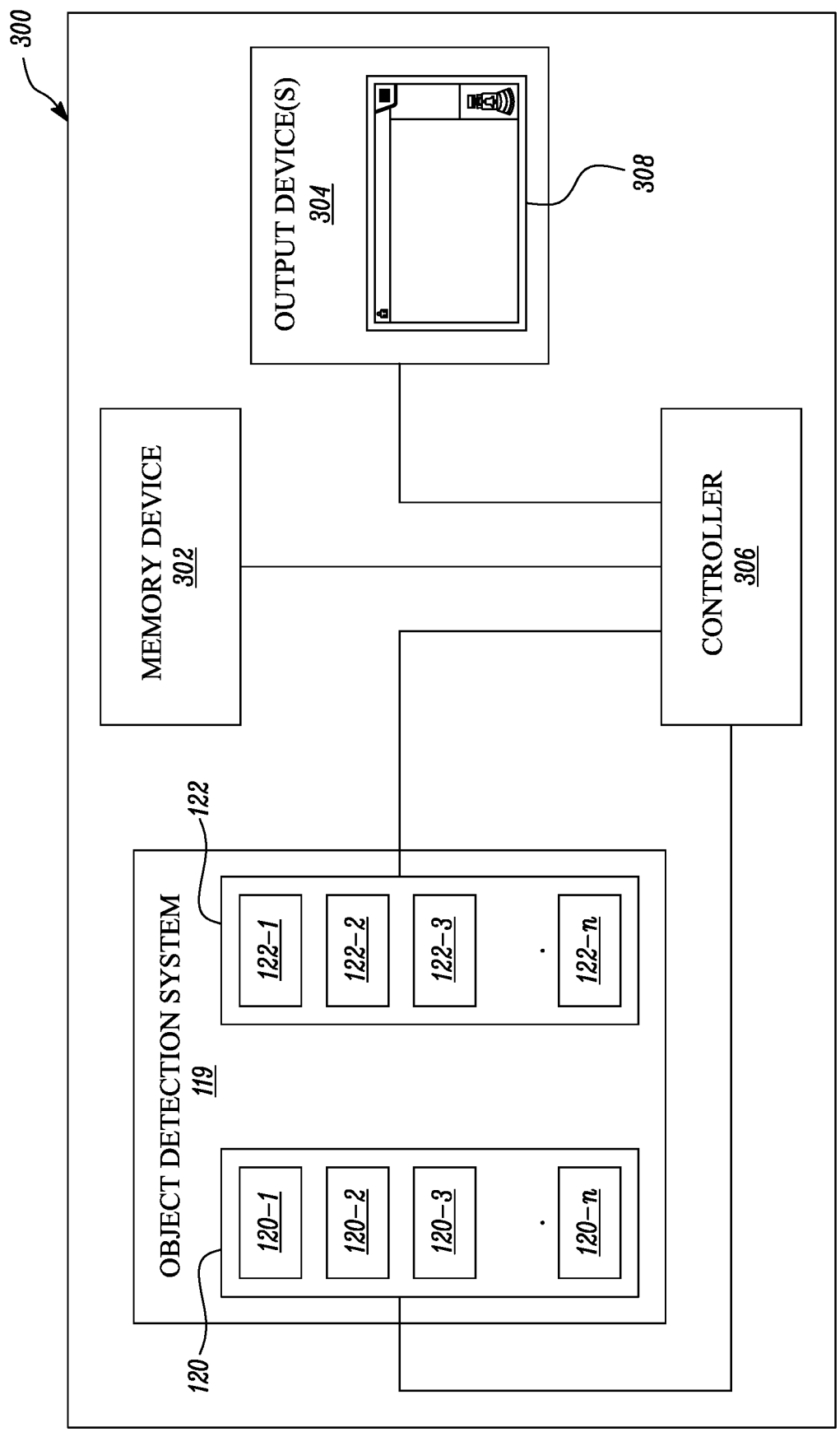
FIG. 3 illustrates a block diagram of the object detection warning system, in accordance with an embodiment of the present disclosure.

Referring to FIG. 3, the object detection warning system 300 includes a memory device 302, one or more output devices 304, the object detection system 119 having the one or more machine cameras 120 and the object detection modules 122, and a controller 306. In an exemplary embodiment of the present disclosure, the one or more components of the system 300 may be configured to communicate via a communication network (not shown). Additionally, or alternatively, the system 300 may include fewer or additional elements, not described herein for the sake of brevity of the disclosure.

The memory device 302 is configured to store a set of instructions that are executable by the controller 306 to perform predetermined operations associated with the machine 100. The memory device 302 may include, but are not limited to, a Random-Access Memory (RAM), a Read Only Memory (ROM), a Hard Disk Drive (HDD), and a Secure Digital (SD) card.

The one or more output devices 304 are configured to provide output to the operator of the machine 100 in the form of audio, video, textual and/or any other form, based on instructions received from the controller 306. The one or more output devices 304 may be positioned within the operator cab 116 of the machine 100 and/or may be remotely located with respect to the machine 100 and the worksite 102. The one or more output devices 304 includes a display unit 308 for providing visual indications to the operator related to various operations of the machine 100. The display unit 308 may embody, for example, a monitor, a Liquid Crystal Display (LCD) screen, a plasma screen, a screen of a handheld device, or any other device capable of providing visual information to the operator of the machine 100. It may be contemplated that the output devices 304 may further include other types of output devices, such as audio output device and/or tactile output device to provide an additional audio and/or tactile indications to the operator in combination with the visual indications, regarding various operations of the machine 100.

The controller 306 is communicably coupled to the memory device 302, the one or more output devices 304, the one or more machine cameras 120 and the object detection modules 122. The controller 306 is configured to execute the instruction stored in the memory device 302 to perform one or more predetermined operations associated with the machine 100. The controller 306 may be implemented using one or more controller technologies, such as Application Specific Integrated Circuit (ASIC), Reduced Instruction Set Computing (RISC) technology, Complex Instruction Set Computing (CISC) technology, etc. According to an embodiment of the present disclosure, the controller 306 may be implemented as an Electronic Control Module (ECM) of the machine 100.

Figure 4:
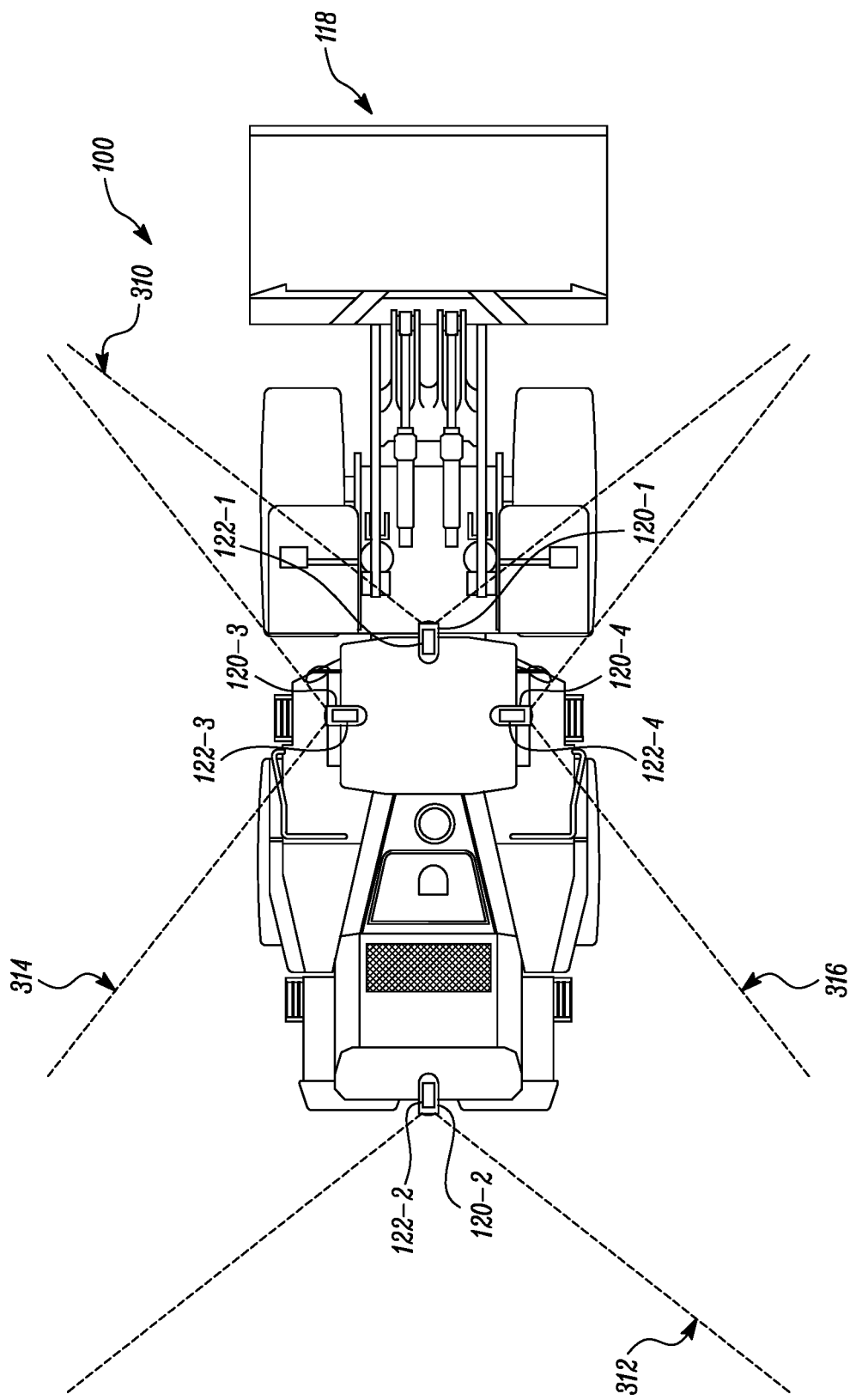
FIG. 4 illustrates a top view of the exemplary machine with associated threat zones, in accordance with an embodiment of the present disclosure.

In an embodiment of the present disclosure, the controller 306 is configured to identify a number of threat zones associated with the machine 100. In one example, the threat zones may be based on the capturing ranges of the object detection modules 122 and/or the field of views of the machine cameras 120 that may cover one or more blind zones or low visibility zones around the machine 100. The capturing ranges of each of the object detection modules 122 as well as the field of views of each of the machine cameras 120 may be stored in the memory device 302, and the controller 306 may identify the threat zones based on the stored capturing range and field of view information. In one example, the controller 306 identifies four threat zones, such as a front threat zone 310, a rear threat zone 312, a left threat zone 314 and a right threat zone 316, as shown in FIG. 4. Accordingly, the front threat zone 310 corresponds to the capturing range of the object detection module 122-1 and the field of view of the machine camera 120-1 positioned on the front of the machine 100, and the rear threat zone 312 corresponds to the capturing range of the object detection module 122-2 and the field of view of the machine camera 120-2 positioned on the rear of the machine 100. Similarly, the left threat zone 314 and the right threat zone 316 correspond to the capturing ranges of the object detection modules 122-3, 122-4 and the field of view of the machine cameras 120-3, 120-4 positioned on the left and right side of the machine 100, respectively. Although, the illustrated threat zones 310, 312, 314, 316, are described to be based on both the capturing ranges of the object detection modules 122 and the field of views of the machine cameras 120, it may be contemplated that in some embodiments where the machine cameras 120 and the object detection modules 122 are independent of one another, some threat zones may be based only on the field of view of machine cameras 120 or only on the capturing ranges of the object detection modules 122, while some of the threat zones may be based on both.

Figure 5:
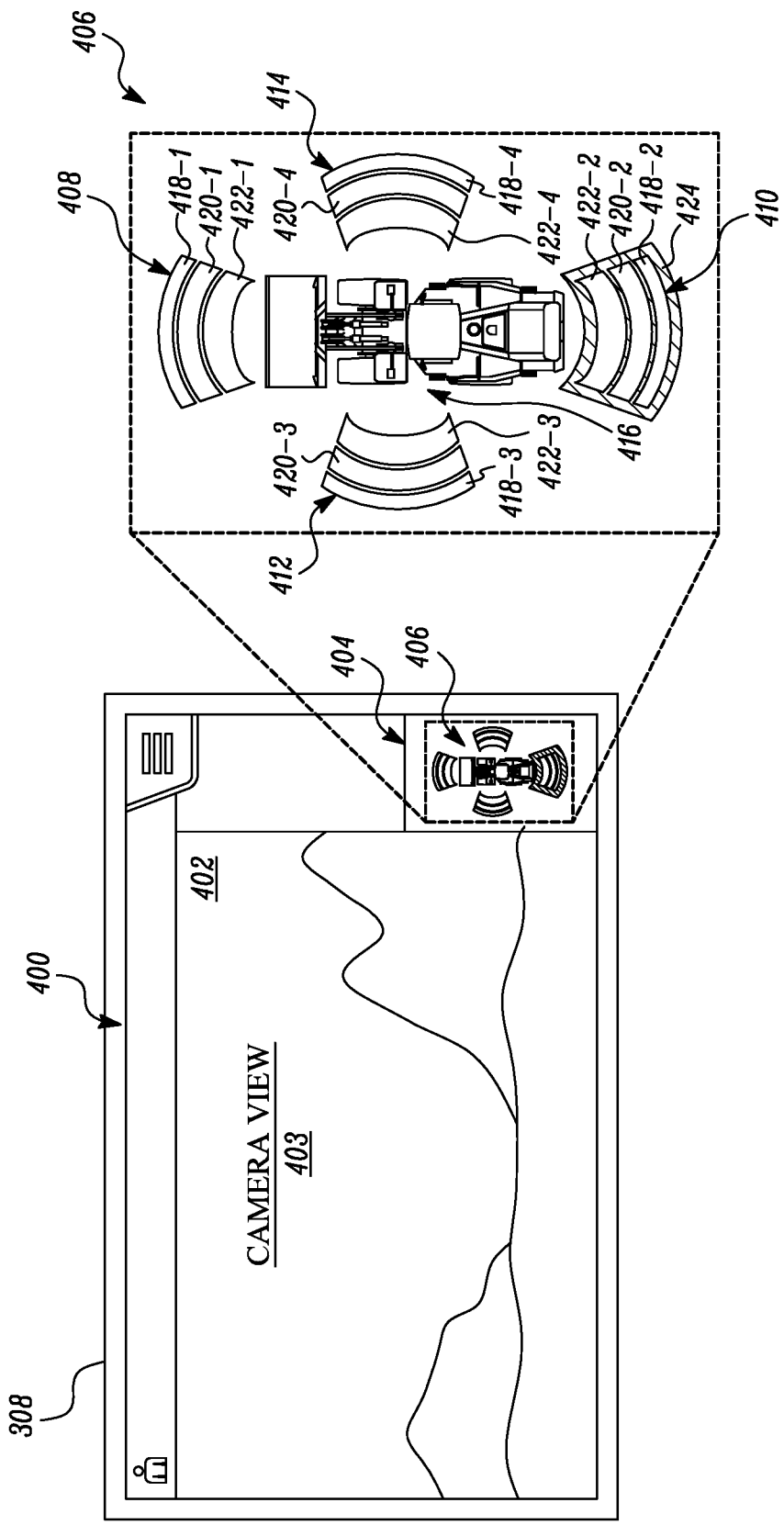
FIG. 5 illustrates an exemplary operator interface, in accordance with an embodiment of the present disclosure.

Referring to FIG. 5, the controller 306 is configured to display an operator interface 400, on the display unit 308, to provide various information to the operator about the operations of the machine 100. In an embodiment of the present disclosure, the operator interface 400 may include a first display section 402 configured to display a camera view 403 captured by one of the machine cameras 120 and a second display section 404 configured to display a threat warning widget 406 for providing an object detection warning to the operator of the machine 100. In one example, the first display section 402 may be displayed as a larger primary section whereas the second display section 404 may be displayed as a smaller auxiliary section on the operator interface 400. In other embodiments, the threat warning widget 406 may be superimposed on the camera view 403 displayed on the first display section 402. It may be further contemplated that the layout of the operator interface 400, the camera view 403 and the threat warning widget 406 is merely exemplary and may be varied without deviating from the scope of the claimed subject matter.

The controller 306 is configured to receive the images captured by each of the machine cameras 120 for displaying the camera view 403 on the display unit 308. In some embodiments, the controller 306 may be configured to display a camera view according to the movement or gear selection of the machine 100. For example, the controller 306 may display the camera view 403 as captured by the rear machine camera 120-2 on the first display section 402 of the operator interface 400, when the machine 100 is in reverse gear or is detected to be moving in reverse direction. Alternatively, or additionally, the controller 306 may switch the camera view 403 displayed on the display unit 308 in response to the operator's selection of one of the machine cameras 120.

The controller 306 is further configured to communicate with the one or more machine cameras 120 and the one or more object detection modules 122 to control display of the threat warning widget 406 on the display unit 308.

In an embodiment of the present disclosure, the threat warning widget 406 includes a number of threat sectors corresponding to and representing each of the identified threat zones 310, 312, 314 and 316. For example, the threat warning widget 406 includes a first threat sector 408 representing the front threat zone 310, a second threat sector 410 representing the rear threat zone 312, a third threat sector 412 representing the left threat zone 314 and a fourth threat sector 414 representing the right threat zone 316. As shown in FIG. 5, the threat sectors 408, 410, 412, 414 are displayed around a machine representation 416 in the center of the widget 406. In one example, the threat sectors 408, 410, 412, 414 are shown to have an arcuate shape, representing the semi-circular capturing ranges of the object detection modules 122 and the field of view of each of the machine cameras 120. However, it may be contemplated that the number, shape and positioning of these threat sectors on the widget 406, are merely exemplary and may be varied to achieve similar results without deviating from the claimed subject matter. It may also be contemplated that the number of threat sectors displayed on the widget 406 may be varied according to the number of object detection modules 122 and the machine cameras 120 positioned on the machine 100. Similar to the threat zones, it may be contemplated that in some embodiments where the machine cameras 120 and the object detection modules 122 are independent of one another, some threat sectors on the widget 406 may be based only on the field of view of machine cameras 120 while some of the threat sectors may be based only on the capturing ranges of the object detection modules 122. For example, when the machine 100 includes only two object detection modules 122 positioned on the front and back side of the machine 100, and four machine cameras 122, then the threat sectors 408, 410 may be based on the capturing range of the object detection modules 122-1, 122-2 as well as the field of view of the machine cameras 120-1, 120-2, whereas the threat sectors 412, 414 are based only on the field of view of the machine cameras 120-3, 120-4 respectively.

Each of the threat sectors 408, 410, 412, 414 includes a number of threat level indicators to indicate a level or criticality of threat warning, as a function of distance as well as position of a detected object relative to the machine 100. For example, each of the threat sectors 408, 410, 412 and 414 includes a first threat level indicator 418 indicating a low criticality warning level, a second threat level indicator 420 indicating a medium criticality warning level and a third threat level indicator 422 indicating a high criticality warning level associated with the object detection near the machine 100. Although there are three threat level indicators described herein, it may be contemplated that the number of threat level indicators displayed on the widget 406 is also exemplary and may be varied without deviating from the scope of the claimed subject matter.

Each of the threat level indicators 418, 420 and 422 are calibrated based on predefined distance ranges with respect to the machine 100. For example, a first distance range between 18 meters to 30 meters from the machine 100 may be used to calibrate the first threat level indicator 418, which indicates a low criticality warning level. Similarly, a second distance range between 8 meters to 18 meters from the machine 100 may be used to calibrate the second threat level indicator 420, which indicates medium criticality warning level. Further, a third distance range between 1 meter to 8 meters from the machine 100 may be used to calibrate the third threat level indicator 422, which indicates the high criticality warning level. The criticality levels associated with these warnings may indicate how much distance and/or time is left for the operator of the machine 100 to take an action in order to avoid collision with the detected object. It may be contemplated that the predefined distance ranges may be varied, such as based on the positioning (for example, height and angle) of the object detection modules 122 and the machine cameras 120 on the machine 100, without deviating from the scope of the claimed subject matter.

In an exemplary embodiment, the threat level indicators 418, 420, 422 may be in the form of color bands based on the level of criticality associated with the warning associated with them. For example, the first threat level indicator 418 may be a yellow colored band to visually indicate a low criticality warning level, the second threat level indicator 420 may be an orange colored band to visually indicate medium criticality warning level and the third threat level indicator 422 may be a red colored band to visually indicate high criticality warning level associated with the object detected in proximity of the machine 100. It may be contemplated that the threat level indicators 418, 420, 422 may be represented in any other manner and/or using any other combination of color-coded representations, to achieve similar results, without deviating from the scope of the claimed subject matter.

In an embodiment of the present disclosure, each of the threat level indicators 418, 420, 422 are configured to be activated by the controller 306, as and when an object is detected within the corresponding distance range (for the threat level indicators 418, 420 and 422) from the machine 100. For example, as soon as an object is detected at a distance within the distance range of first threat level indicator 418, i.e., less than 30 meters and more than 18 meters from the machine 100, the yellow colored band of the first threat level indicator 418 is activated by the controller 306, thereby indicating to the operator of the machine 100, a low criticality warning level associated with the detected object. Similarly, when the object comes closer to the machine 100, and is at a distance less than 8 meters and greater than or equal to 1 meter, the third threat level indicator 422 is activated by the controller 306 to indicate a high criticality warning level associated with the detected object. Furthermore, in an exemplary embodiment, the third threat level indicator 422 may be further configured to blink at a predefined frequency (for example, 10 times per minute) when the detected object comes even closer to the machine 100 such that a distance between the object and the machine 100 is less than the third distance range corresponding to the third threat level indicator 422. Therefore, the blinking third threat level indicator 422 may indicate to the operator that an urgent and immediate action, such as stopping the machine 100 movement, is required to be taken to avoid collision with the detected object.

In an embodiment, the controller 306 is configured to control the display of the widget 406 according to a position of the detected object relative to the machine 100. The controller 306 is configured to determine the position of the detected object relative to the machine 100, based on the information received from one of the object detection modules 122 that detects the object in proximity of the machine 100. The position of the object relative to the machine 100 indicates whether the object is detected on the left or right or rear or front of the machine 100.

Furthermore, based on the detected position of the object, the controller 306 is configured to identify one of the threat zones 310, 312, 314, 316, within which the object is positioned, and accordingly identify the relevant threat sectors 408, 410, 412, 414 and the respective threat level indicators 418, 420, 422, to be activated on the widget 406. For example, when the object detection module 122-3, positioned on the left side of the machine 100, detects an object at a distance of 15 meters from the machine 100, the controller 306 identifies and activates the corresponding threat level indicator of a threat sector, i.e., the second threat level indicator 420-3 (in orange color) of the third threat sector 412 on the left, on the widget 406 for providing the object detection warning to the operator of the machine 100.

In an embodiment of the present disclosure, the controller 306 is further configured to provide a visual indication on the widget 406, along with the object detection warning, for indicating an active machine camera 120 being displayed on the first display section 402 of the user interface 400. As shown in FIG. 5, the controller 306 is configured to outline and/or highlight (as shown by 424) one of the threat sectors 408, 410, 412, 414 to indicate the machine camera being displayed as the camera view 403. In some examples, the controller 306 may highlight and/or outline one of the threat sectors 408, 410, 412, 414 in a fourth color, such as blue, which is not otherwise included anywhere in the widget 406. In one example, the controller 306 is configured to identify the object detection module 122 being positioned in conjunction to the active machine camera 120, and accordingly highlight and/or outline one of the threat sectors 408, 410, 412, 414 displayed on the widget 406, corresponding to the determined object detection module 122. For example, if the rear machine camera 120-2 is being displayed on the first display section 402 of the operator interface 400, then the controller 306 identifies the second object detection module 122-2 positioned on the rear side of the machine 100 and accordingly highlights (as shown by 424) the second threat sector 410 on the widget 406. Alternatively, where the machine cameras 120 are positioned independent of the object detection modules 122, the controller 306 may highlight one the threat sectors on the widget 406, based only on the identified machine camera 120. In this case, even when the object detection is not available in any one or more of the threat zones around the machine 100, the widget 406 may provide a visual indication of one of the machine cameras 120 being viewed on the display unit 308 by highlighting one of the threat sectors on the widget 406.

Therefore, during operation, the threat warning widget 406 of the present disclosure, provides a dual indication to the operator, i.e., of an object detection warning (indicating how close the object is from the machine 100 and on which side of the machine 100 is the object positioned) as well as an indication of the active machine camera 120 being viewed on the display unit 308. In cases where there are multiple objects detected in proximity of the machine 100, all the corresponding threat sectors 408, 410, 412, 414 and their threat level indicators 418, 420, 422 may be activated by the controller 306, in a similar manner as described above.

INDUSTRIAL APPLICABILITY

The object detection warning system 300, in accordance with the embodiments of the present disclosure, provides information about an object detected in proximity of the machine 100. The object detection warning system 300 displays a threat warning widget 406 on a display unit 308 associated with the machine 100, where the widget 406 provides a visual indication of the object detection warning along with an indication of which machine camera 120 is being viewed on the display unit 308 alongside of the widget 406.

Figure 6:
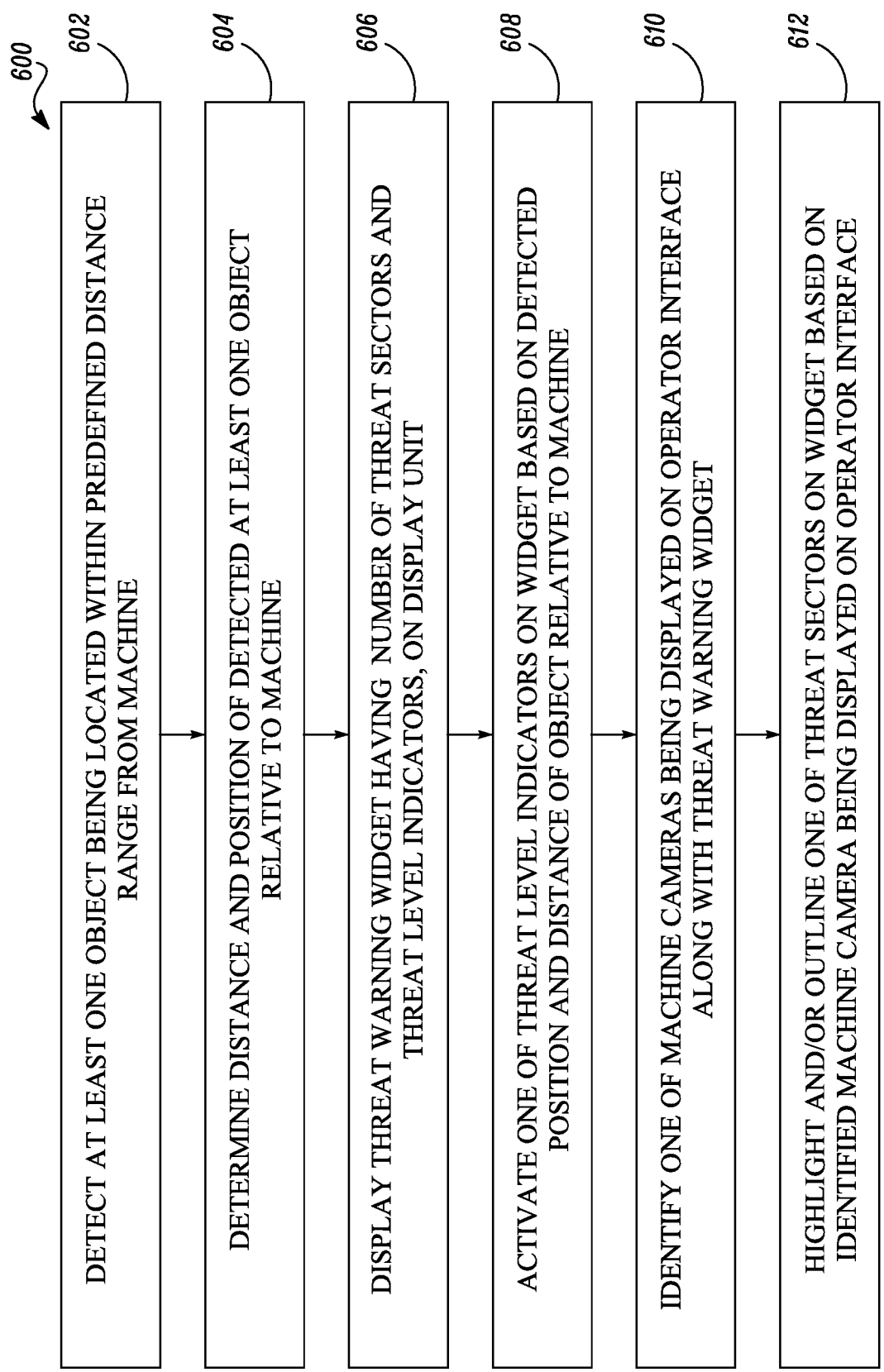
FIG. 6 illustrates a method flowchart for providing object detection warning, in accordance with an embodiment of the present disclosure.
Figure 7:
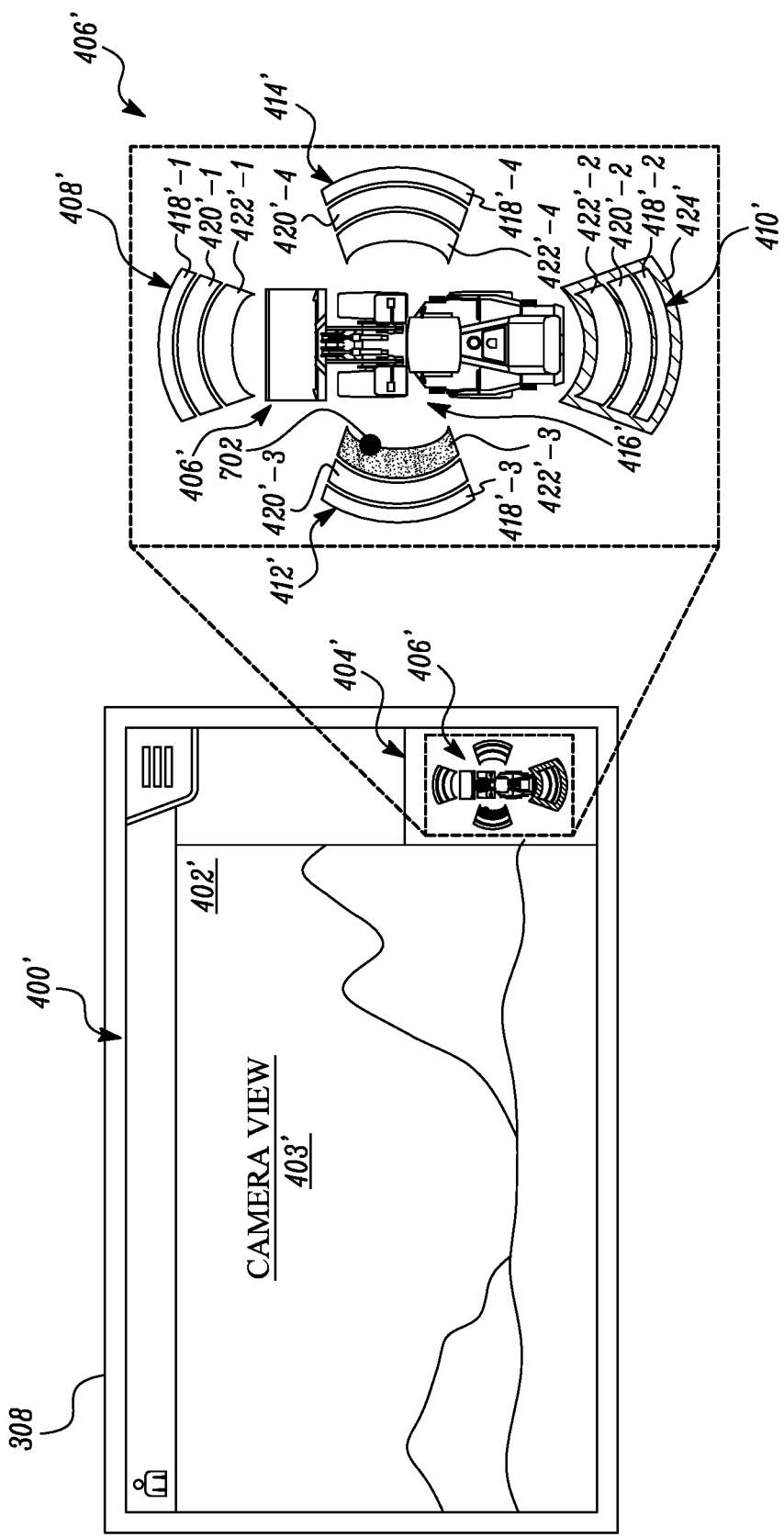
FIG. 7 illustrates an operator interface displaying the object detection warning, in accordance with the embodiment of the present disclosure.

FIG. 6 illustrates an exemplary method for providing an object detection warning to an operator of the machine 100. FIG. 7 illustrates an exemplary widget 406' displayed on the display unit 308 for providing the object detection warning, when an object 702 is detected in proximity of the machine 100.

Referring to FIGS. 6 and 7, during operation of the machine 100 at the worksite 102, at step 602, the controller 306 detects, using the one or more object detection modules 122, that the object 702 is positioned in proximity of the machine 100, i.e., within a predefined distance range from the machine 100. For example, one or more object detection modules 122-1, 122-2, 122-3 and 122-4 positioned on the machine 100 are configured to detect the object 702 within a predefined range of distances and provide position information about the detected object 702 relative to the machine 100 to the controller 306.

At step 604, the controller 306 determines a position and a distance of the object 702 relative to the machine 100. For example, the distance of the object 702 determines how far is the object 702 from the machine 100, and the position of the object 702 determines which side (such as front, rear, left or right side) of the machine 100 is the object 702 detected. The controller 306 may identify the position of the object 702, based on the positioning of the respective object detection module 122 that detected the object 702. Therefore, when the object detection module 122-3 positioned on the left of the machine 100 detects the object 702, the controller 306 automatically knows the position of the object 702 to be on the left side of the machine 100. Further, the controller 306 identifies one of the threat zones 308, 312, 314, 316 in which the object 702 is detected, based on the determined position of the object 702 relative to the machine 100.

At step 606, the controller 306 displays the threat warning widget 406' on the display unit 308, for providing object detection warning to the operator of the machine 100. In an embodiment of the present disclosure, the threat warning widget 406' includes a number of threat sectors 408, 410, 412, 414 and a number of threat level indicators 418, 420, 422 that represent warning levels as function of position and distance of the object 702 relative to the machine 100. As illustrated, each of the threat sectors 408, 410, 412, 414 include their respective threat level indicators 418, 420, 422 displayed on the widget 406'. Each of the threat sectors 408, 410, 412, 414 indicate the position of the detected object 702 relative to the machine 100, and the threat level indicators 418, 420, 422, within each of the threat sectors 408, 410, 412, 414, indicate the distance of the detected object 702 relative to the machine 100. For example, the threat level indicators 418-3, 420-3, 422-3 positioned within the third threat sector 412 are indicative of distance of the object 702 detected on the left side of the machine 100. Similarly, the threat level indicators 418-2, 420-2, 422-2 positioned within the second threat sector 410 are indicative of distance of an object detected on the rear side of the machine 100.

In an exemplary embodiment, by default, all the threat sectors 408, 410, 412 414' and their corresponding threat level indicators 418, 420, 422 remain deactivated on the widget 406'. In one example, all the threat sectors 408', 410, 412, 414 and their respective threat level indicators 418, 420, 422 may be displayed in one color, such as grey color to indicate the deactivated state. At step 608, the controller 306 activates one of the threat level indicators 418, 420, 422 of one of the threat sectors 408, 410, 412, 414 based on the detected position and distance of the object 702 relative to the machine 100. For example, as shown in FIG. 7, when the object 702 is detected on the left side of the machine 100 at a distance of 7 meters, the controller 306 activates the third threat level indicator 422-3, by highlighting it in red color, on the third threat sector 412 displayed on the widget 406', thereby indicating to the operator that the object 702 is located on the left side of the machine 100 and requires an immediate action by the operator, such as stopping the machine 100 movement, to avoid collision.

At step 610, the controller 306 further identifies one of the machine cameras 120 being displayed as camera view 403' on the operator interface 400' along with the threat warning widget 406'. The controller 306 identifies the corresponding object detection module 122 positioned in conjunction to the identified machine camera 120 and/or the field of view of the identified machine camera 120 being displayed. At step 612, based on the identified machine camera 120 being viewed as the camera view 403', the controller 306 highlights and/or outlines the corresponding one of the threat sectors 408, 410, 412, 414 on the widget 406', thereby indicating to the operator which machine camera 120 is being viewed on the operator interface 400'. For example, if the machine camera 120-2, positioned on the rear side of the machine 100, is active and displayed on the operator interface 400', then the controller 306 accordingly highlights or outlines (as shown by highlight 424') the second threat sector 410 on the widget 406'.

The threat warning widget 406, 406' of the present disclosure provides two types of indications to the operator of the machine 100. Firstly, the object detection warning, whenever the object 702 is detected anywhere in proximity of the machine 100, both in terms of distance and position of the detected object 702 relative to the machine 100. Secondly, the widget 406, 406' also makes the operator aware of the machine camera 120 being displayed on the display unit 308. Therefore, when the object 702 is detected on a side which is not being currently displayed on the display unit 308, the operator will know from the widget 406, 406' and accordingly switch to view the relevant machine camera to view the detected object 702 on the display unit 308 and take appropriate actions. In cases where there are multiple objects detected in proximity of the machine 100, all the corresponding threat sectors 408', 410', 412', 414' and threat level indicators 418', 420', 422' will be activated in a manner described above.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A method of providing object detection warning to an operator of a machine, the machine including one or more object detection sensors, a display unit and a controller communicably coupled to the one or more object detection modules and the display unit, and one or more machine cameras positioned on the machine, the method comprising:
    detecting, by the controller using the one or more object detection sensors, at least one object being located within a predefined distance range from the machine;
    determining, by the controller using the one or more object detection sensors, a distance and position of the detected at least one object relative to the machine;
    displaying, by the controller on the display unit, a threat warning widget including a plurality of threat level indicators, each of the threat level indicators being representative of a warning level as a function of distance and position of the object relative to the machine, and a plurality of threat sectors corresponding to a field of view of each of the machine cameras;
    activating, by the controller, at least one threat level indicator based on the determined distance and position of the detected at least one object relative to the machine;
    identifying, by the controller, one of the machine cameras being displayed on the display unit along with the threat warning widget; and
    highlighting, by the controller on the display unit, one of the threat sectors on the threat warning widget, based on the identified machine camera being displayed on the display unit.

2. The method of claim 1, wherein the threat warning widget includes a plurality of threat sectors corresponding to a capturing range of each of the one or more object detection sensors, each of the threat sectors further including a plurality of threat level indicators.

3. The method of claim 2 further comprising:
    detecting, by the controller using the one or more object detection sensors, the at least one object being positioned within one of the plurality of threat sectors; and
    activating, by the controller, one of the threat level indicators of the detected threat sector displayed on the display unit.

4. The method of claim 1, wherein each of the plurality of threat level indicators correspond to a predefined range of distances from the machine.

5. The method of claim 1, wherein the plurality of threat level indicators includes a first indicator representing a low criticality warning level, a second indicator representing a medium criticality warning level and a third indicator representing high criticality warning level.

6. The method of claim 1, wherein the plurality of threat level indicators includes at least one threat level indicator blinking at a frequency.

7. An object detection warning system for a machine, the system comprising:
    one or more object detection sensors, positioned on the machine, for detecting at least one object being located within a predefined distance range from the machine;
    one or more machine cameras positioned on the machine;
    a display unit for displaying a threat warning widget including a plurality of threat level indicators, each of the threat level indicators being representative of a warning level as a function of distance and position of the object relative to the machine, and a plurality of threat sectors corresponding to a field of view of each of the machine cameras;
    a controller communicably coupled to the one or more object detection sensors and the display unit, the controller being configured to:
        determine a distance and position of the detected at least one object relative to the machine;
        control the display of the threat warning widget on the display unit by activating at least one threat level indicator of the plurality of threat level indicators based on the determined distance and position of the detected at least one object relative to the machine;
        identifying, by the controller, one of the machine cameras being displayed on the display unit along with the threat warning widget; and
        highlighting, by the controller on the display unit, one of the threat sectors on the threat warning widget, based on the identified machine camera being displayed on the display unit.

8. The object detection warning system of claim 7, wherein the threat warning widget includes a plurality of threat sectors corresponding to a capturing range of each of the one or more object detection sensors, each of the threat sectors further including a plurality of threat level indicators.

9. The object detection warning system of claim 8, wherein the controller is further configured to:
   detect the at least one object being positioned within one of the plurality of threat sectors; and
   activate one of the threat level indicators of the detected threat sector of the threat warning widget displayed on the display unit.

10. The object detection warning system of claim 7, wherein each of the plurality of threat level indicators correspond to a predefined range of distances from the machine.

11. The object detection warning system of claim 7, wherein the plurality of threat level indicators displayed on the display unit, includes a first indicator representing a low criticality warning level, a second indicator representing a medium criticality warning level and a third indicator representing high criticality warning level.

12. The object detection warning system of claim 7, wherein the plurality of threat level indicators includes at least one threat level indicator blinking at a predefined frequency.

13. A machine comprising:
   an object detection warning system including:
      one or more object detection sensors positioned on the machine for detecting at least one object being located within a predefined distance range from the machine,
      one or more machine cameras positioned on the machine,
      each of the one or more object detection sensors and the machine cameras defining a plurality of threat zones associated with the machine;
      a display unit for displaying a threat warning widget including a plurality of threat sectors for each of the plurality of threat zones, each of the threat sectors including a plurality of threat level indicators being representative of warning levels as function of distance and position of the object relative to the machine; and
      a controller communicably coupled to the one or more object detection sensors and the display unit, the controller being configured to:
         determine a distance of the detected at least one object relative to the machine;
         detect the at least one object being positioned within a threat zone;
         control the threat warning widget displayed on the display unit by activating at least one threat level indicator of one of the threat sectors based on the detected threat zone and the distance of the detected at least one object relative to the machine;
         identify one of the machine cameras being displayed on the display unit along with the threat warning widget; and
         highlight one of the threat sectors on the threat warning widget, based on the identified machine camera being displayed on the display unit.

14. The machine of claim 13, wherein each of the plurality of threat level indicators correspond to a predefined range of distances from the machine.

15. The machine of claim 13, wherein the plurality of threat level indicators displayed on the display unit, includes a first indicator representing a low criticality warning level, a second indicator representing a medium criticality warning level and a third indicator representing high criticality warning level.

16. The machine of claim 13, wherein the plurality of threat level indicators includes at least one threat level indicator blinking at a predefined frequency.

\* \* \* \* \*